(12) United States Patent
Mittelstein et al.

(10) Patent No.: US 7,061,610 B2
(45) Date of Patent: Jun. 13, 2006

(54) PHOTONIC INTEGRATED CIRCUIT BASED PLANAR WAVELENGTH METER

(75) Inventors: Michael Mittelstein, Laguna Niguel, CA (US); Hongmin Chen, Worcester, MA (US)

(73) Assignee: Technology Asset Trust, Placentia, CA (US)

( * ) Notice: Subject to any disclaimer, the term of this patent is extended or adjusted under 35 U.S.C. 154(b) by 309 days.

(21) Appl. No.: 10/366,953

(22) Filed: Feb. 14, 2003

(65) Prior Publication Data

US 2004/0161194 A1 Aug. 19, 2004

(51) Int. Cl.
*G01J 3/28* (2006.01)
*G02B 6/34* (2006.01)

(52) U.S. Cl. ........................................ 356/328; 385/37
(58) Field of Classification Search ................ 356/328, 356/334, 37; 385/37; 372/32
See application file for complete search history.

(56) References Cited

U.S. PATENT DOCUMENTS

| 4,729,658 A * | 3/1988 | Poultney ...................... 356/328 |
| 6,701,042 B1 * | 3/2004 | Kang et al. ................... 385/37 |
| 6,859,469 B1 * | 2/2005 | Hedin et al. .................. 372/32 |
| 2001/0024275 A1 * | 9/2001 | Suzuki et al. ............... 356/328 |
| 2002/0154855 A1 * | 10/2002 | Rose et al. ................... 385/37 |
| 2002/0191887 A1 * | 12/2002 | Bidnyk ......................... 385/15 |

* cited by examiner

*Primary Examiner*—Gregory J. Toatley, Jr.
*Assistant Examiner*—Kara Geisel
(74) *Attorney, Agent, or Firm*—Edward C. Kwok; MacPherson Kwok Chen & Heid LLP

(57) ABSTRACT

A method and device for measuring the wavelength of a source, for example monitoring a laser used in DWDM fiber optic communications systems, wherein the method and device comprise using a coarse arrayed waveguide grating (AWG) to resolve an ambiguity of wavelength measurement in a fine arrayed waveguide grating. The wavelength monitor or meter of the present invention may be configured as a standalone device suitable for use in many different applications and may also be integrated into a laser or laser array for use in DWDM fiber optic communications systems.

66 Claims, 11 Drawing Sheets

FIG. 3
(Prior Art)
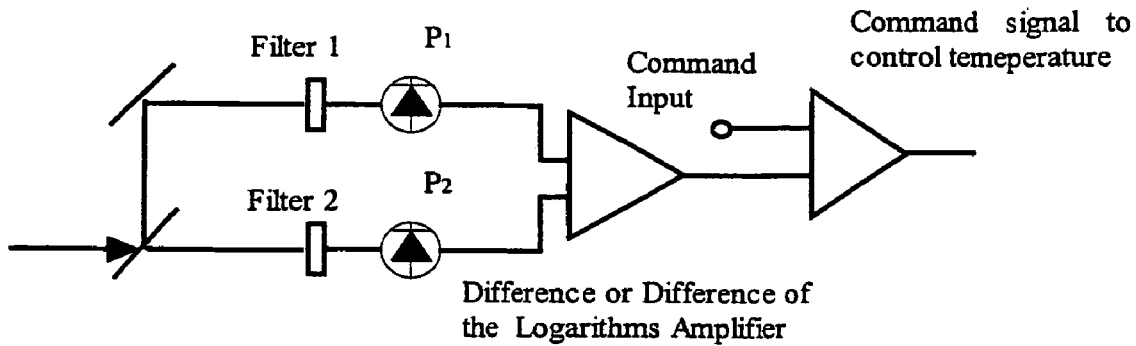
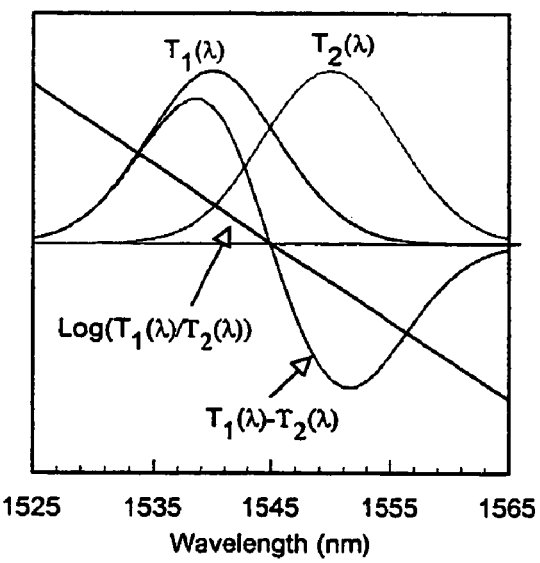
FIG. 4
(Prior Art)

FIG. 11A
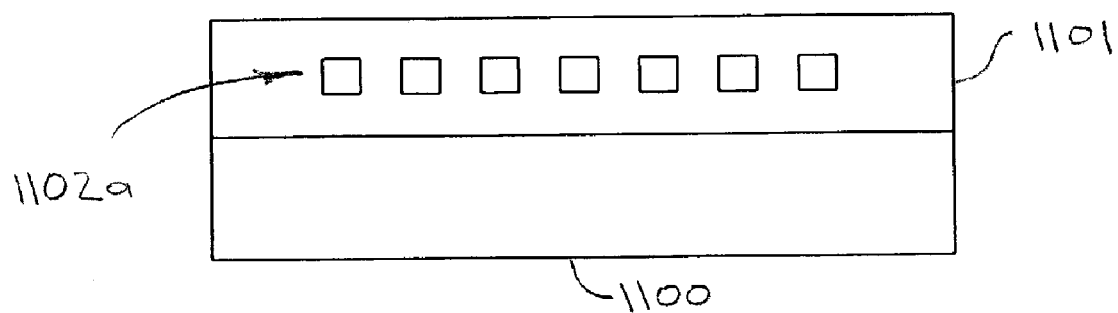
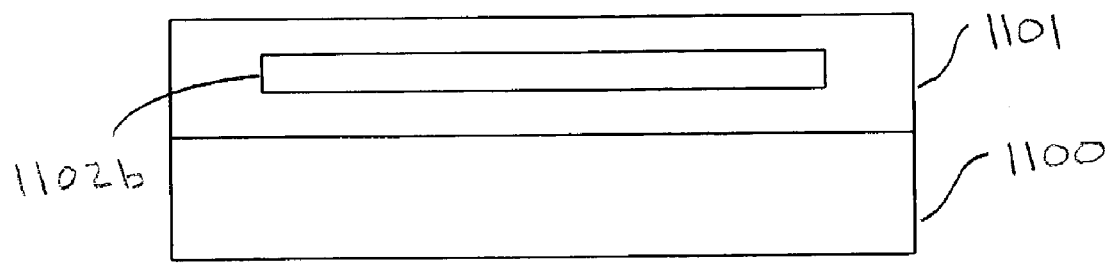
FIG. 11B

PHOTONIC INTEGRATED CIRCUIT BASED PLANAR WAVELENGTH METER

FIELD OF THE INVENTION

The present invention relates generally to a wavelength meter which comprises a plurality of arrayed-waveguide-gratings (AWGs) or interferometers. Within a predetermined spectral range the present invention provides a substantially instantaneous absolute wavelength meter. The present invention relates more particularly to a dense wavelength-division multiplexing (DWDM) fiber optic communication system laser wavelength meter or monitor. The present invention is, for instance, suitable for use in controlling the output of a variable wavelength laser.

BACKGROUND OF THE INVENTION

Standalone wave meters are well known. Standalone wave meters are used to determine the wavelength of light incident upon a detector thereof. Standalone wave meters have different applications, including the testing and calibration of monochromatic light sources. Examples of such monochromatic light sources include lasers which are used in dense wavelength-division multiplexing (DVDM) fiber optic communications systems. Standalone wave meters may also be used to determine the wavelength of light which is output from lasers in a wide variety of other applications.

Although such standalone wave meters are useful for many different purposes, they are not typically integrated permanently into DWDM fiber optic communications systems for maintaining the desired channel center frequencies of the lasers of such system because of their size and cost. As those skilled in the art will appreciate, such standalone wave meters are typically too large to be permanently integrated into such DWDM fiber optic communications systems. Such standalone wave meters are also comparatively expensive, and thus cannot be deployed on a wide scale within such systems.

DWDM is considered to be the key technology to upgrade existing fiber optic networks to higher transmission capacities. Those skilled in the art will appreciate that an increase in demand for data carrying capacity can be accommodated by increasing the number of wavelength channels on a single fiber via the use of DWDM. Such enhancements in the data carrying capacity of an optical fiber communications system is a cost-effective alternative to laying new fiber in the ground.

Presently, the total usable bandwidth of a DWDM fiber optic communications system is limited by the bandwidth of erbium-doped fiber amplifiers. Because of this total usable bandwidth limitation, data carrying capacity must be enhanced by more effectively utilizing this available bandwidth. The total usable bandwidth can be more efficiently utilized by decreasing the channel spacing of the wavelength-division multiplexing fiber optic communication system. However, precise control of each channel center frequency must be maintained in order to avoid channel cross talk, which would otherwise inhibit utilization of such decreased channel spacing.

The International Telecommunication Union (ITU) specification is presently set to a 100 GHz channel spacing (equivalent to 0.8 nm), but a move toward 12.5 GHz (0.1 nm) is expected in the near future. To avoid channel cross talk in such a DWDM system, the laser wavelength should be kept to one specified ITU standard frequency of the grid. A wavelength tunable laser, such as a distributed feedback (DFB) laser or a distributed Bragg reflector (DBR) laser, in cooperation with a wavelength monitor which can monitor the laser's wavelength and provide feedback to lock the laser wavelength onto one of the wavelengths of the ITU grid standard, is essential to the success of future DWDM systems.

DFB lasers and DBR lasers appear to be candidates for laser sources in DWDM fiber optic communications systems because of their single longitudinal mode operation, wavelength tunability, and low cost. Generally, their wavelengths can be tuned over several nanometers using temperature adjustment. A wavelength tuning range covering the whole C-band (1530 nm–1565 nm) can be achieved with, for instance, a laser array. Also, DFB lasers and DBR lasers with wavelengths in the S-band (1480 nm–1530 nm) and the L-band (1565 nm–1600 nm) have been studied extensively.

One common way of locking the laser wavelength onto the ITU grid involves using a Fabry-Perot etalon. The etalon has a periodical wavelength response as shown in FIG. 1. The period of the wavelength response (free spectrum range, FSR) is beneficially designed to be the DWDM channel spacing. For example, the etalon in FIG. 1 has a FSR of 50 GHz (0.4 mm). In such applications, the wavelength of maximum signal slope is beneficially designed to be at the ITU grid wavelength, so that this etalon can be used to lock the laser wavelength onto the ITU grid.

The capture range is defined as the range over which the laser wavelength can be accected and brought to lock onto one specified wavelength, for instance an ITU wavelength of the grid. In this application the capture range is defined by a continuous monotone portion of the response curve (which determines the etalon's output signal) which has sufficient slope. Generally, the locking range of a wavelength locker based on a single etalon is less than half of its FSR. Common methods of increasing the practical locking range include the use of a temperature controlled wavelength locker and the use of dual-etalon wavelength locker.

The drawbacks of such wavelength lockers which are based on a single etalon include channel ambiguity. Because of the inherent periodical wavelength response of the etalon, it is not possible to distinguish which period (that is, which wavelength channel of the grid) the laser wavelength is locked onto based only on the information provided by the wavelength locker itself. Other means are required to determine the channel number at which the laser wavelength is locked. For example, the channel number may be identified by the laser temperature in the case of temperature tuned DFB lasers and DBR lasers.

However, in some cases, especially for systems using fast switching, the channel number (coarse wavelength) of the laser may not be provided, so other methods for channel identification are required.

Another method of wavelength locking without channel ambiguity has been demonstrated and is based on the use of two narrow bandpass filters (BPF). FIG. 3 is a schematic diagram of such a wavelength locker based on two narrow bandpass filters (BPF). The laser beam is split with a beam splitter and then sent through two BPFs. As shown in FIG. 4, the wavelength response curves of the BPF is beneficially a Gaussian curve, the bandwidths of the two BPFs are beneficially designed to be the same, and only different peak transmission wavelength are used. The difference or the logarithms of the two filters' output is beneficially the feedback input to the laser wavelength control loop.

The advantage of this scheme is that as long as there is sufficient overlap of the two response curves, the laser wavelength can be locked to a wavelength between the peak wavelengths of two filters (FIG. 4) or any wavelength at which sufficient signal is provided in both channels ($P_1$ and $P_2$ in FIG. 3 and in FIG. 4) respectively. However, the slope efficiency, which is inversely proportional to the peak wavelength difference, is generally low, which will limit the wavelength locking precision.

Combining the two methods mentioned above, using the dual BPF as the channel identification means to bring the laser wavelength within the capture range of the etalon, and subsequently locking the laser's wavelength onto the specified ITU grid with the etalon, may provide a wavelength locker without channel ambiguity and can provide a wavelength locker with high slope efficiency. However, isolated optics components of the above-described methods are difficult to assemble and package.

Wavelength monitors based on integrated optical circuits (10C) have also been demonstrated. Integrated wavelength monitors include Mach-Zehnder interferometers and arrayed waveguide gratings (AWGs).

As shown in FIG. 5, an arrayed waveguide grating (AWG) generally consists of L input waveguides 501, an input slab waveguide 502, M intermediate waveguides 503, an output slab waveguide 504, and N output waveguides 505. Wherein L is 1 or more, M is 2 or more and N is 1 or more. The non-slab waveguides, 501, 503 and 505, are single mode waveguides. They are coupled to the slab waveguides 502 and 504 at the input and output sides thereof. The slab waveguides, 502 and 504, have symmetric curved input and output sides, such that for a central input the pathway length to any of the outputs are equal, as well as for a central output the pathways from all inputs are equal. All single mode waveguides coupling to a slab waveguide on one side are tangentially directed to the center of the opposing side.

Note that in the case of only one or two waveguides (FIG. 6) on a side there is no basis for a curved end of the slab waveguide and a simpler straight side may be implemented with no loss of functionality. Furthermore, based on the specific input used there will be a strongly monotone change in phase with lateral position at the output side of the slab waveguide except for the special case of a central input (FIG. 6) for which the phase is constant over the lateral position at the output side.

Light comes in from one of the input waveguides 501 and is transmitted across the input slab waveguide 502. In the input slab waveguide 502 the light will disperse with propagation and then couple into the intermediate waveguides 503. The intermediate waveguides 503 in turn are arranged such that for each pair of directly adjacent waveguides the effective optical path length difference is non-zero and is the same, such that the optical path length changes monotonically with lateral position (from one intermediate waveguide 503 to the next adjacent.) In general, if individual intermediate waveguides 503 are labeled consecutively with an index i, for one with neighboring waveguides on both sides its length and the length of the directly adjacent waveguides $l_i$, $l_{i-1}$, $l_{i+1}$, are related as follows: $l_i - l_{i-1} = l_{i+1} - l_i$.

The light travels from the intermediate waveguides 503 into the output slab waveguide 504. Upon propagating through the output slab waveguide 504, light is dispersed towards the output waveguides 505. Upon entering the output waveguides 505, light having emerged from the various intermediate waveguides 503 interferes. Since the output waveguides support only a single mode, only positively interfering components of the input will be transmitted through the output waveguides 505. Due to different geometric arrangements, different output waveguides will have different wavelength responses. The coherent addition of the contributions of the waveguides is equivalent to a properly used grating where the contributions from each of the individual steps coherently add, thereby justifying the often used term "grating waveguides" for the intermediate waveguides 503.

In considering directly adjacent intermediate waveguides 503, the effective optical path length difference accumulated upon traveling through the waveguides 501, 503 and 505 and the slab waveguides 502 and 504 has to be equal to an integer number of full wavelengths for intensity maxima to occur at the output of the waveguides 505. Such integer number is referred to the "order" of the grating.

Integrated optical circuits have the advantages of being easy to assemble and package. However, wavelength meters based on integrated optical circuits covering a relative large predetermined range (for instance the whole C-band), and providing wavelength precision of approximately 1 GHz have not yet been demonstrated. Therefore, it would be beneficial to provide wavelength meters based on integrated optical circuits which cover the whole C-band, and which provide wavelength precision of approximately 1 GHz.

SUMMARY OF THE INVENTION

The present invention specifically addresses and alleviates the above-mentioned deficiencies associated with contemporary dense wavelength division multiplexing (DWDM) wavelength monitors. More generally, the present invention comprises a method and device for measuring the wavelength of a source, for example monitoring a laser used in DWDM fiber optic communications systems, wherein the method and device comprises using a coarse arrayed waveguide grating (AWG) to resolve an ambiguity of wavelength measurement in a fine arrayed waveguide grating. The wavelength monitor or meter of the present invention may be configured as a standalone device suitable for use in many different applications and may also be integrated into a laser or laser array for use in DWDM fiber optic communications systems. Indeed, those skilled in the art may find various other applications of the present invention, wherein the wavelength monitor or meter is integrated into a system.

These, as well as other advantages of the present invention would be more apparent from the following description and drawings. It is understood that changes in the specific structure shown and described may be made within the scope of the claims without departing from the spirit of the invention.

BRIEF DESCRIPTION OF THE DRAWINGS

Various features, aspects and advantages of the present invention will be more fully understood when considered with respect to the following detailed description, appended claims, and accompanying drawings, wherein:

FIG. 3 is a schematic diagram of a contemporary wavelength locker based upon two narrow bandpass filters;

FIG. 4 is a chart showing the frequency response of the wavelength locker of FIG. 3;

FIG. 11A is a schematic diagram showing in cross-section waveguide structure for the channel waveguides of FIG. 9A;

FIG. 11B is a schematic diagram showing in cross-section waveguide structure for the slab waveguides of FIG. 9A;

DETAILED DESCRIPTION OF THE INVENTION

Figure 1:
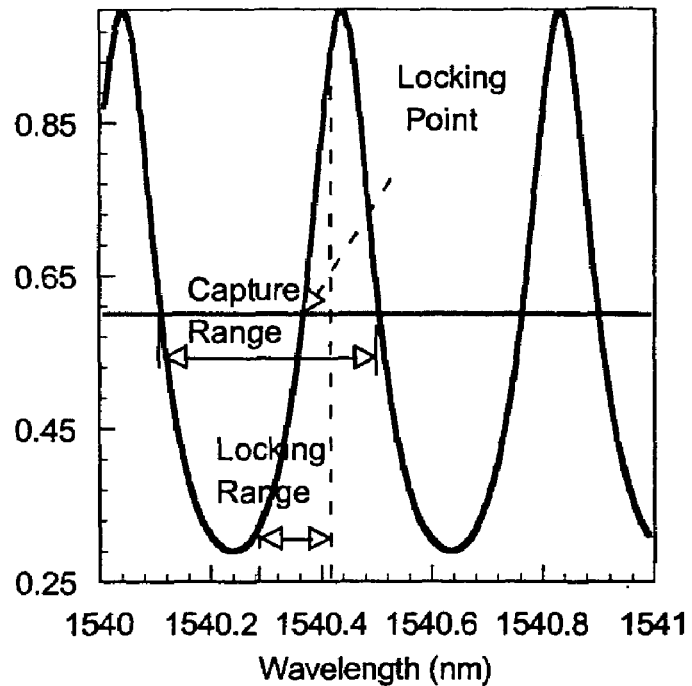
FIG. 1 is a chart showing the wavelength response of a contemporary Fabry-Perot etalon wavelength locker.
Figure 2:
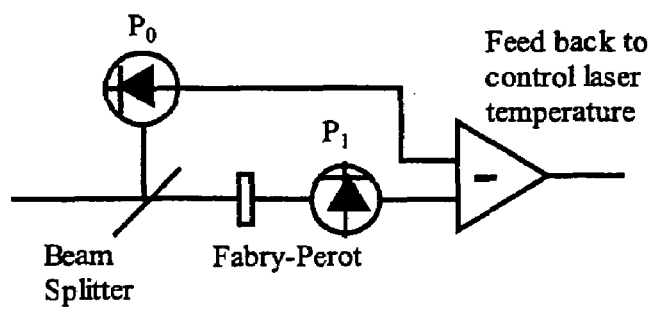
FIG. 2 is a schematic diagram of a contemporary wavelength locker based upon a single etalon.
Figure 5:
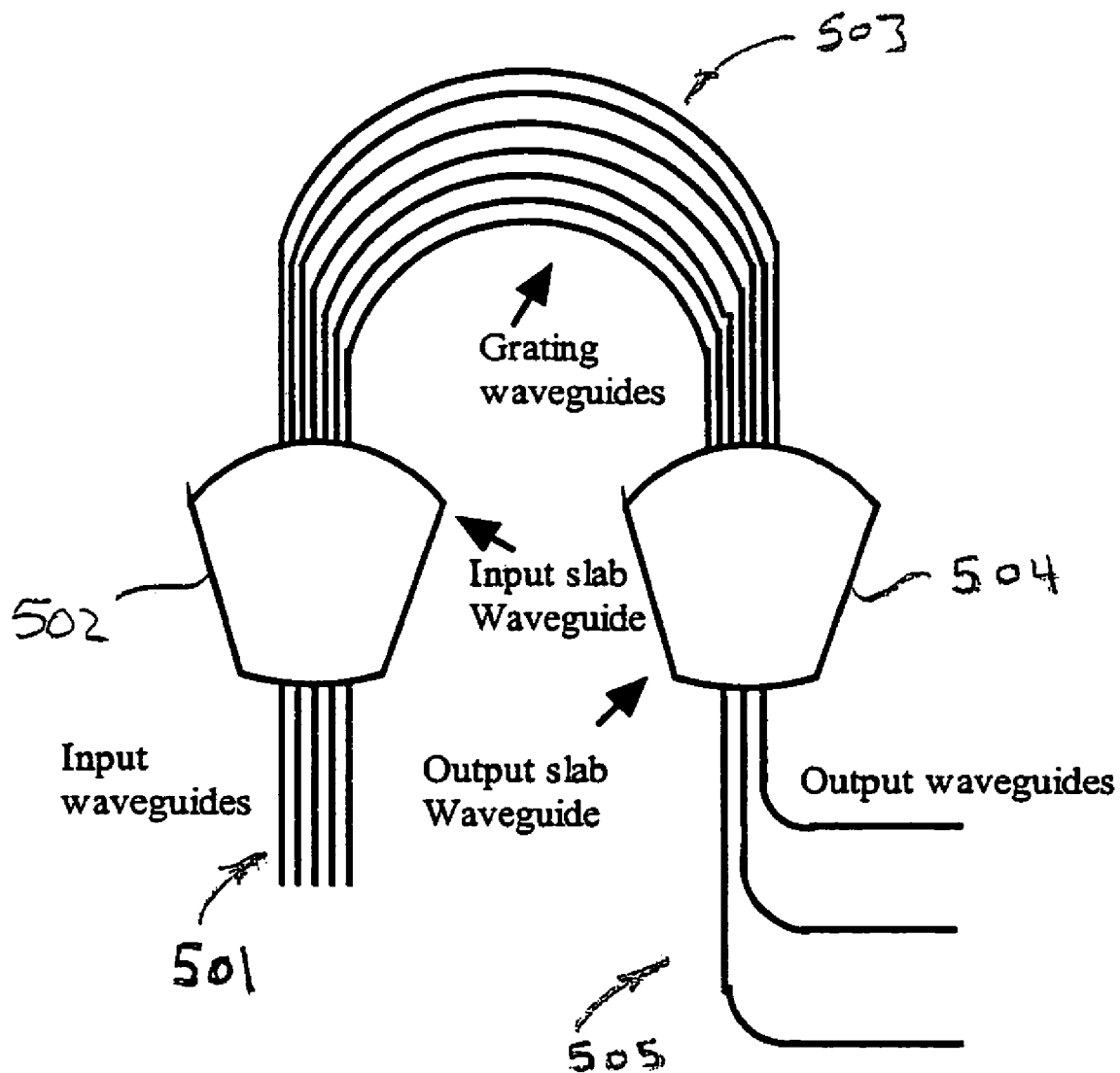
FIG. 5 is a schematic diagram of a contemporary arrayed waveguide grating.

The detailed description set forth below in connection with the drawings is intended as a description of presently preferred embodiments of the invention, and is not intended to represent the only forms in which the present invention may be constructed or utilized. The detailed description sets forth the construction and functions of the invention, as well as the sequence of steps for operating the invention in connection with the illustrated embodiments. It is to be understood, however, that the same or equivalent functions may be accomplished by different embodiments that are also intended to be encompassed within the spirit and scope of the invention.

The invention comprises a wavelength meter, for instance suitable for use in dense wavelength-division multiplexing optical fiber communications systems which is based upon multiple arrayed waveguide gratings or interferometers. These elements have, in general, an essentially periodic wavelength response. Consequently a single element can only determine, without ambiguity, the wavelength of a laser over a measuring range which is smaller than its period in the response. If a coarse element has a precision such that it resolves the ambiguity for the fine element, then the combination of these elements provides for a measuring range determined by the coarse element with the high resolution of the fine element. Furthermore, if the desired resolution of the system is such that the resolution of the coarse element is insufficient to resolve the ambiguity for the fine element, then intermediate resolution elements can be added to fulfill these requirements in a cascaded fashion.

Thus, the coarse element may, for example, determine which DWDM channel a laser operates on, while the fine element determines the wavelength of the laser within that channel.

The present invention utilizes a plurality of arrayed-waveguide-gratings (AWGs) or interfereometers wherein elements are shared between them, for example common input waveguides and common input slap waveguides. The present invention utilizes a arrayed-waveguide-gratings (AWGs) modified such that apertures on the output side of the output slab waveguide substitute for the output waveguides and perform an equivalent function. The present invention further comprises a photodiode array and associated mounting scheme which is used to obtain compact and robust designs of the wavelength meter or a similar system.

The present invention further comprises integrating a signal multiplexer into the package of the wavelength meter or similar system.

The present invention further comprises the application of such a wavelength meter for applications such as high speed switching (approximately 1 microsecond) of a DWDM laser or laser array or similar system.

Two Element Implementation

One embodiment of the present invention comprises a two element wavelength meter, which is discussed in detail below. This two element embodiment of the present invention can be used when the resolution requirement is such that the resolution of the fine element fulfills it and the resolution of the coarse element is sufficient to resolve the wavelength ambiguity of the fine element (without the need for one or more intermediate resolution elements) and the measuring range of the coarse element covers the total range requirement.

The first specific embodiment of the wavelength meter is based on the use of two AWGs. One AWG is configured to be able to measure the laser wavelength within a large range (a range covering the whole C-band, for example) with coarse precision so that the channel number of the laser wavelength can be determined. The other AWG is designed to have a periodical wavelength response and to be able to measure the laser wavelength with a theoretical precision of less (better) than 1 GHz. This precision may be limited by temperature variations and other factors. Both AWGs share the same input and utilize the same input slab waveguides without loss of functionality, since they are both operating in parallel with one another. The design criteria used included a fine AWG with a free spectral range of an assumed system gride of 0.4 nm (50 GHZ).

Figure 6:
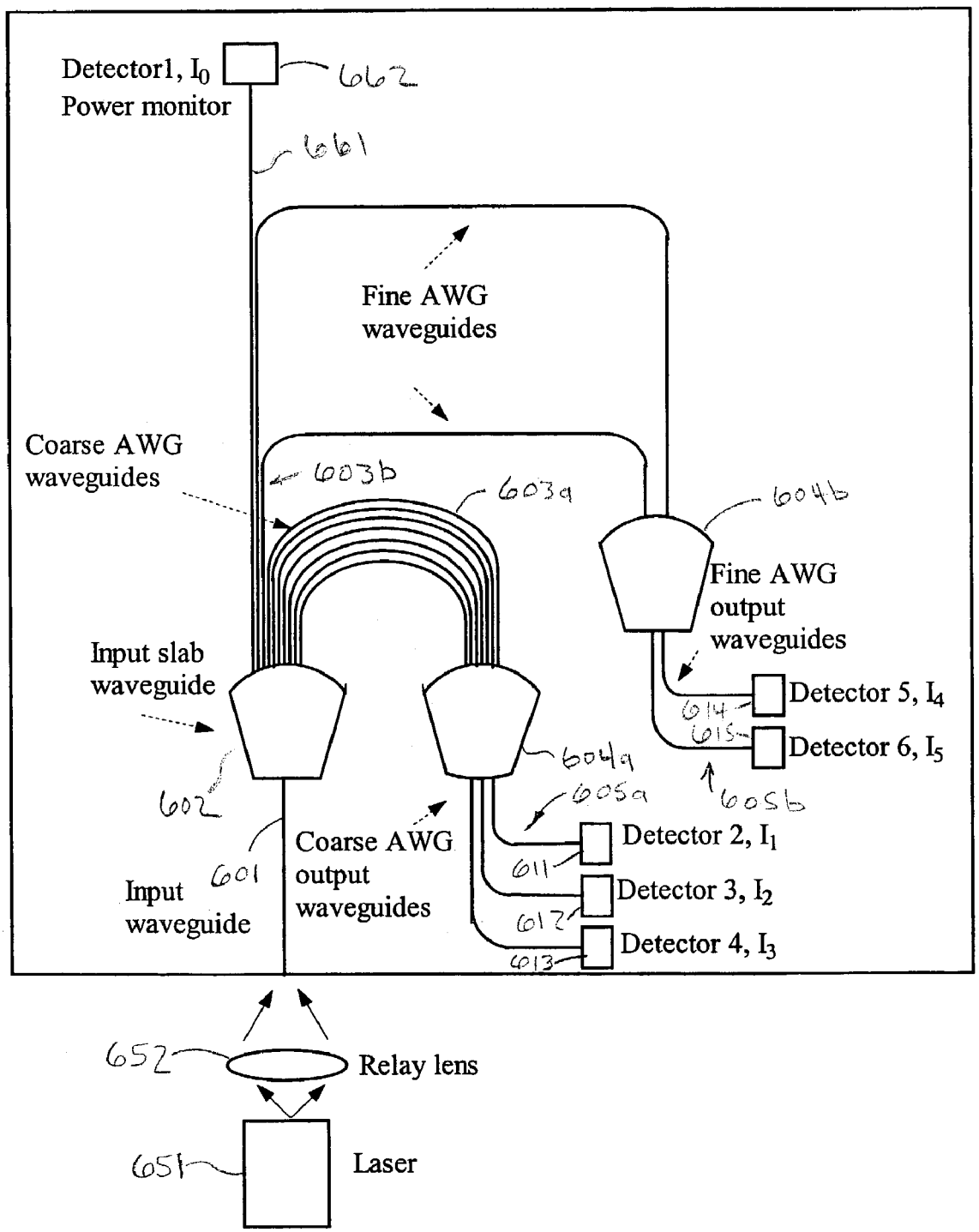
FIG. 6 is a schematic diagram of one embodiment of a wavelength meter based upon two arrayed wavelength gratings, according to the present invention.

Referring to FIG. 6, a schematic diagram of a wavelength meter of the present invention which comprises two AWGs is shown. The first AWG is referred to as the coarse AWG and is preferably used to measure the coarse wavelength of the laser with a wavelength range equal to the C-band and a precision of better than ±12.5 GHz. The coarse AWG comprises the input waveguide 601, the input slab waveguide 602, for example six intermediate AWG waveguides 603a, the coarse output slab waveguide 604a, and for example three output waveguides 605a. The output light intensities of the three output waveguides 605a are measured with the three photodetectors 611, 612 and 613, respectively.

The fine AWG comprises the input waveguide 601, the input slab waveguide 602, the fine AWG waveguides 603b, the fine output slab waveguide 604b and the fine output waveguides 605b. Thus, the coarse AWG and the fine AWG both share the input waveguide 601 and the input slab waveguide 602. The fine AWG with a free spectral range of 50 GHz comprises two intermediate waveguides 603b and two output waveguides 605b. The output light intensities of the two output waveguides 605b are measured with two photodetectors 614 and 615, respectively.

A laser 651, such as a laser used in a DWDM fiber optic communications system, transmits some of its light through relay lens 652 (in general an optical system dividing off a portion of the total available light and transmitting and coupling it) to the input waveguide 601.

Figure 7A:
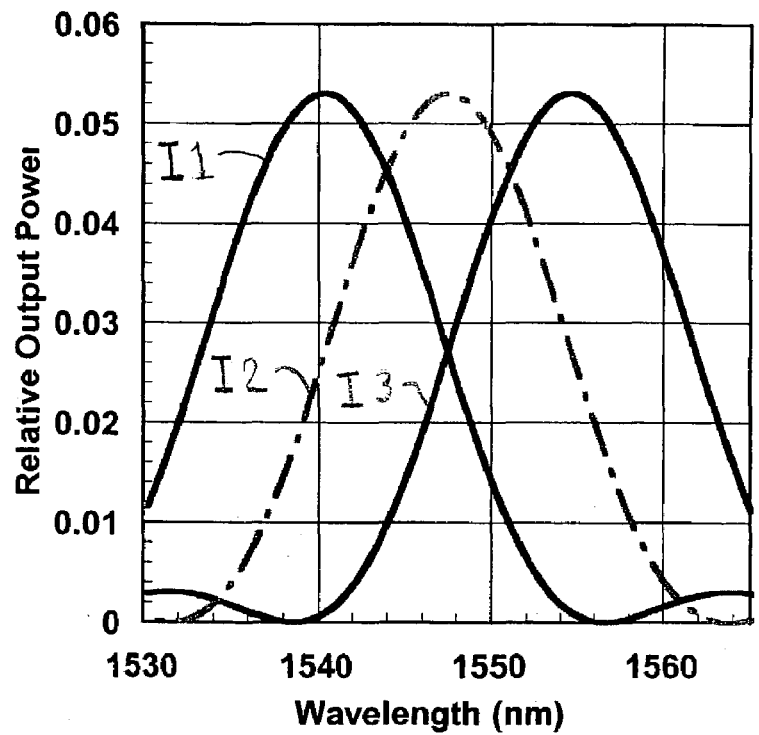
FIG. 7A is a chart showing the wavelength responses of the coarse arrayed waveguide grating using six waveguides and 18th order through the design wavelength range, the C-band.

Referring now to FIG. 7A, the wavelength responses of the three output waveguides 605a are designed such that no less than one detector response has sufficient amplitude (more then 20% of the peak amplitude) and simultaneously sufficient slope (more then 70% of the peak slope) spanning the whole C-band.

Referring again to FIG. 6, the fine AWG is used to determine the fine or more precise wavelength of the laser. The fine AWG may also be utilized by itself to lock the laser wavelength in the case that the coarse AWG is determined to be correct. The fine AWG has two intermediate waveguides 603b, and two output waveguides 605b. As mentioned above, the output light intensities are measured with two photodetectors 614 and 615, separately.

Because there are only two intermediate waveguides 607b, the wavelength responses of the output waveguides are essentially sinusoidal. The period of the wavelength response is a consequence of the effective optical path length difference between two waveguides 603b. Preferably, the length difference is designed so that the wavelength response period is 50 GHz (0.4 nm). Those skilled in the art will appreciate that other response periods are likewise suitable. Their response peak is at wavelength determined by the lateral position of the output waveguides 614 and 615 on the output slab 604b.

Figure 8A:
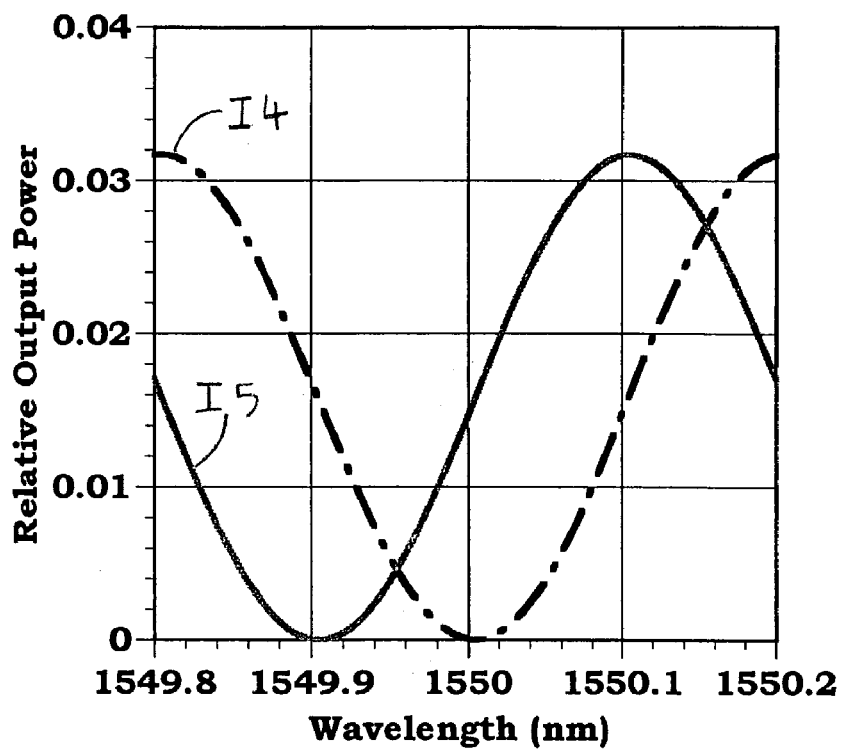
FIG. 8A is a chart showing the wavelength responses of the fine arrayed wavelength grating output.

Preferably, the two output waveguides' positions are configured so that the wavelengths for their response peak are 90 degrees phase shifted to each other (with respect to their response period, often commonly referred to as quatrature detectors) as shown in FIG. 8. With such a 90 degree phase shift and essentially sinusoidal wavelength response, any wavelength within one period is uniquely determined and provides a slope in the wavelength response of at least 70% of the peak slope in at least one of the two detectors. Therefore, the wavelength measurement provided by the present invention is continuous through a period.

Optionally, a portion of the light output of the input slab waveguide 602 is coupled into another waveguide 661, at the end of which a photodetector 662 is used to measure the laser intensity ($I_o$).

Utilizing calibrated wavelength response curves of the three outputs of the coarse AWG, the laser wavelength can be determined with coarse precision. The precision of the measurement is determined by the slope efficiency of the wavelength response curve (shown in FIG. 7B), the peak wavelength output intensity, and the noise of the measurement system. In general the precision of the wavelength measurement $\sigma_v$ can be expressed as:

$$\sigma_{vi} = \frac{I_n}{I_{0i} S_i(v)} \text{ with } S_i(v) = \frac{1}{I_{0i}} * \frac{dI_i(v)}{dv} \text{ for } i = 1, 2, 3$$

Figure 7B:
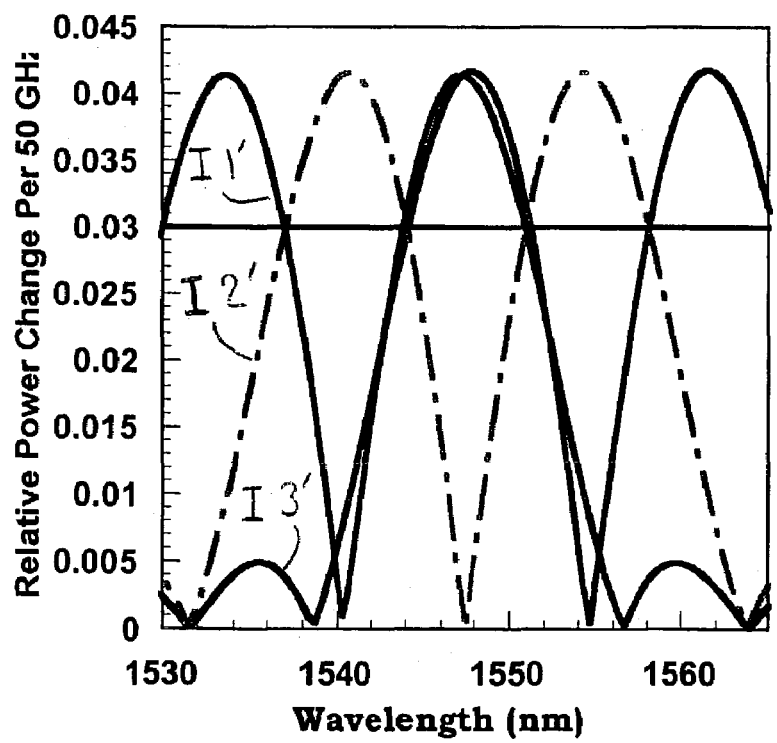
FIG. 7B is a chart showing the corresponding slope efficiency for the outputs of the coarse arrayed waveguide grating of FIG. 7A.

In which, $I_{0i}$ is the peak signal current of the $i^{th}$ photodetector and $S_i(v)$ defines the slope efficiency where $I_i$ is the actual signal current. This relation holds for $I_i(v) \gg I_n$. For a pin detector working at room temperature, the noise current $I_n$ is assumed to be 10 nA (considered equal in all detectors). In the coarse wavelength measurement, $\sigma_{vi}$ is required to be less than 25 GHz, so, the product $I_{0i}*S_i(v)$ must be larger than 5 nA/GHz. FIG. 7B shows the $S_i(v)$ of the coarse AWG outputs. From FIG. 7B we can see the three outputs of the coarse AWG, the area of slope efficiencies larger than 0.03/50 GHz covers the whole C-band. Which means, for the coarse measurement with a required precision of less than 25 GHz, and photodetector noise current of 10 nA, the peak wavelength output intensity should be larger than 0.67 µA, which should be achievable with a total input optical power in the input waveguide of 0.025 mW and photodetector conversion efficiency of 0.5 mA/mW. The minimum of $I_i(v)$ as utilized is ~20% of $I_{0i}$ such that $I_i(v) \gg I_n$ holds.

The fine AWG is used to measure the laser wavelength with a theoretical precision of better than 0.65 GHz.

Figure 8B:
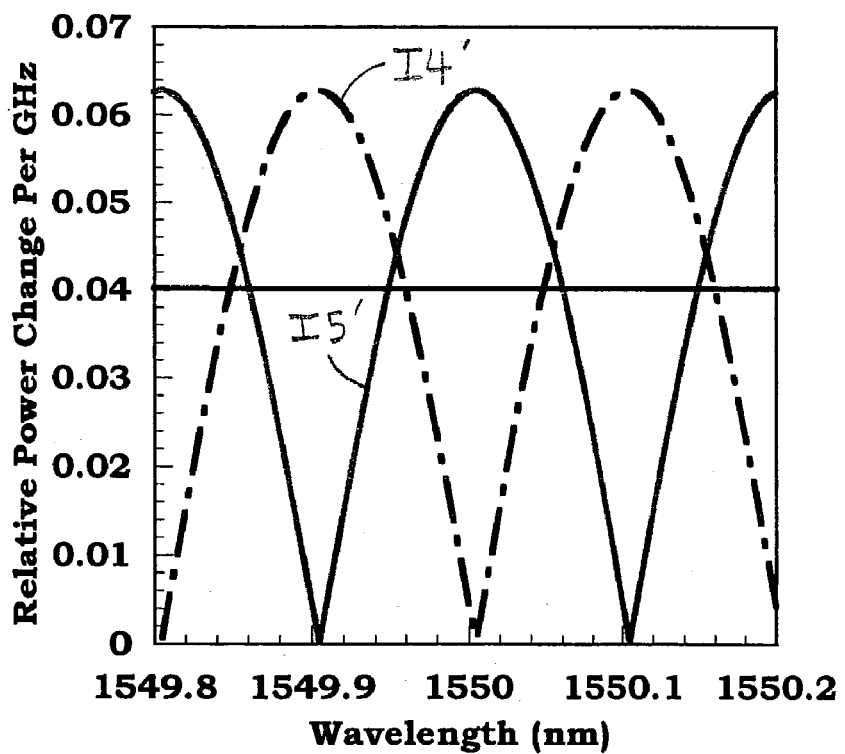
FIG. 8B is a chart showing the corresponding slope efficiency of the outputs of the fine arrayed waveguide grating of FIG. 8A.

FIG. 8B shows the slope efficiencies of the fine AWG wavelength response curve, from which we can see, with the two output of the fine AWG, the areas of the slope efficiencies larger than 0.04/GHz covers the whole period. Which means, if the noise current of the photodetector is 10 nA, the required peak wavelength output intensity of the fine AWG is 0.4 µA. This can be obtained from input power in the input waveguide of 0.025 mW and photodetector conversion efficiency of 0.5 mA/mW. The minimum of $I_i(v)$ as utilized is ~20% of $I_{0i}$ such that $I_i(v) \gg I_n$ holds.

It should be noted, that in cases were another means to determine the channel number information exists (for example, the temperature information of the temperature tuned DFB laser) the fine AWG itself can be used to monitor the laser wavelength over the full range.

Combining the coarse wavelength measurement with a coarse AWG and fine wavelength measurement with a fine AWG, wavelength monitoring with precision of less than 1 GHz, without channel ambiguity continuously over the full range is achieved with only 0.025 mW optical input power. Subsequent computational means are to be used to process the data representing the photodetector signals to reach the resultant determination of the wavelength.

Three Element Implementation

Figure 9A:
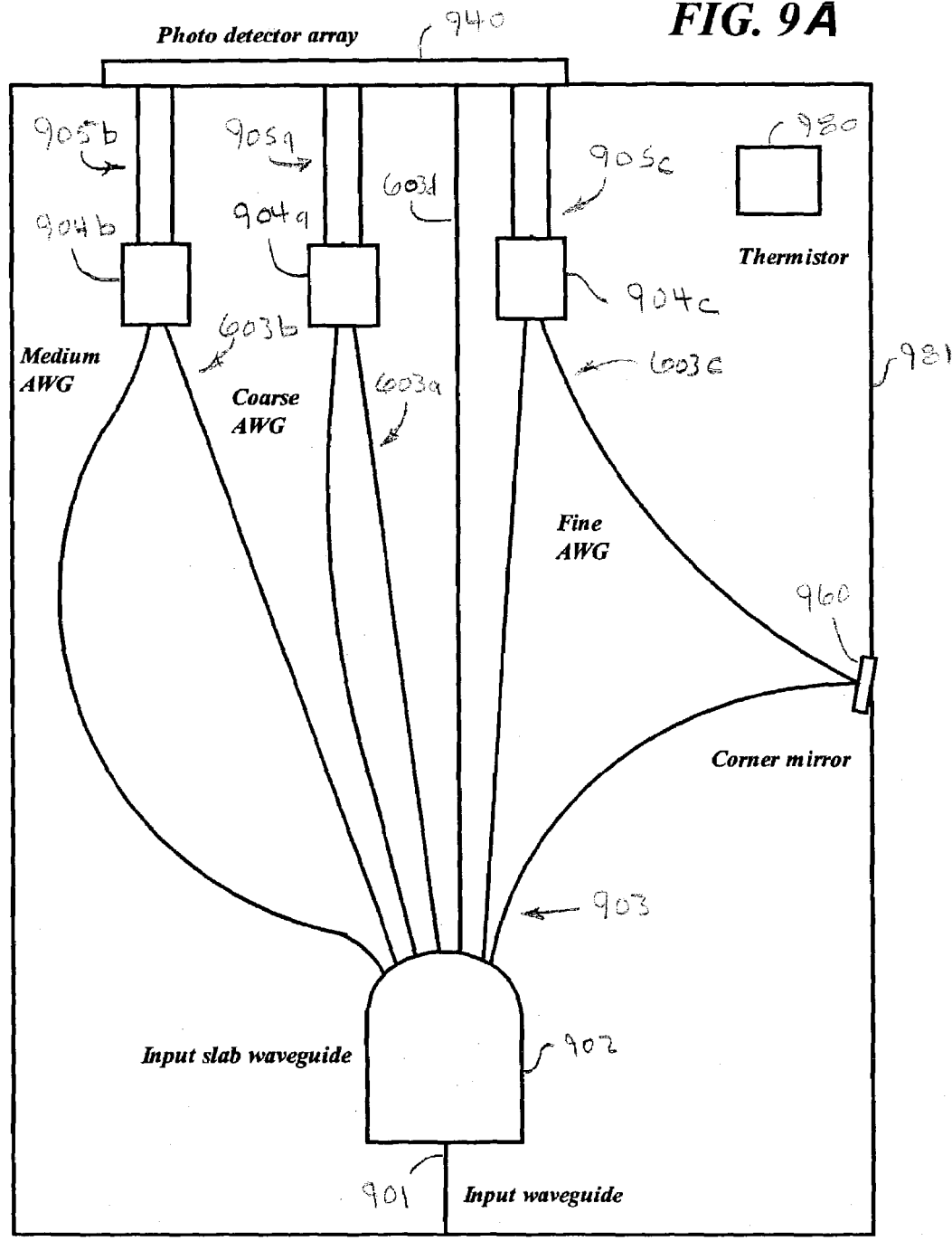
FIG. 9A is a schematic diagram of another embodiment of a wavelength meter based upon three arrayed wavelength gratings wherein a reflector is used to facilitate increased path length of one waveguide and/or to facilitate a more compact layout of at least one waveguide, according to the present invention.

Referring now to FIG. 9A, a second embodiment of the present invention comprises a three element wavelength meter. This three element embodiment of the present invention is used when the resolution of the system is such that the resolution of the coarse element is insufficient to resolve the wavelength ambiguity of the fine element and thus at least one intermediate element is required. Thus, the second embodiment of wavelength monitor includes three AWGs: a coarse AWG, a medium AWG, and a fine AWG. Optionally, as in the first embodiment of the present invention, a power monitor is also included. Laser light is coupled into the input waveguide 901 with a focusing lens (as in the first embodiment of the present invention) and is then transmitted into the input slab waveguide 902.

Figure 9B:
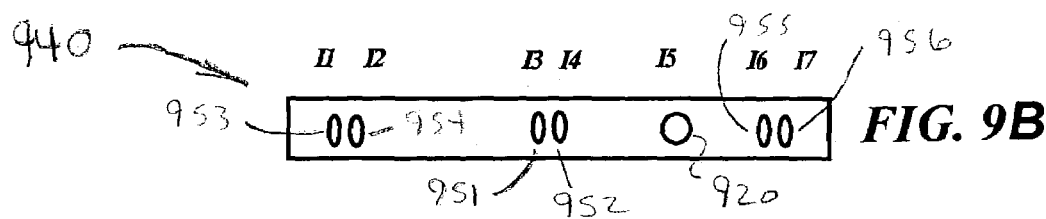
FIG. 9B is a schematic diagram better showing the photodetector array of FIG. 9A.

At the output of the input slab waveguide, the light is preferably coupled into seven waveguides. The first and second waveguides 603b are connected to the medium AWG output slab waveguide 904b. The third and fourth waveguides 603a are connected to the coarse AWG output slab waveguide 904a. The fifth waveguide 603d transmits the light to the power monitor photodiode 920 (FIG. 9B). The sixth and seventh waveguides are connected to the fine AWG output slab waveguide 904c.

Due to utilization of AWGs with two waveguides in each instance, the output wavelength responses of all AWGs are essentially sinusoidal responses.

Figures 10A, 10B, 10C:
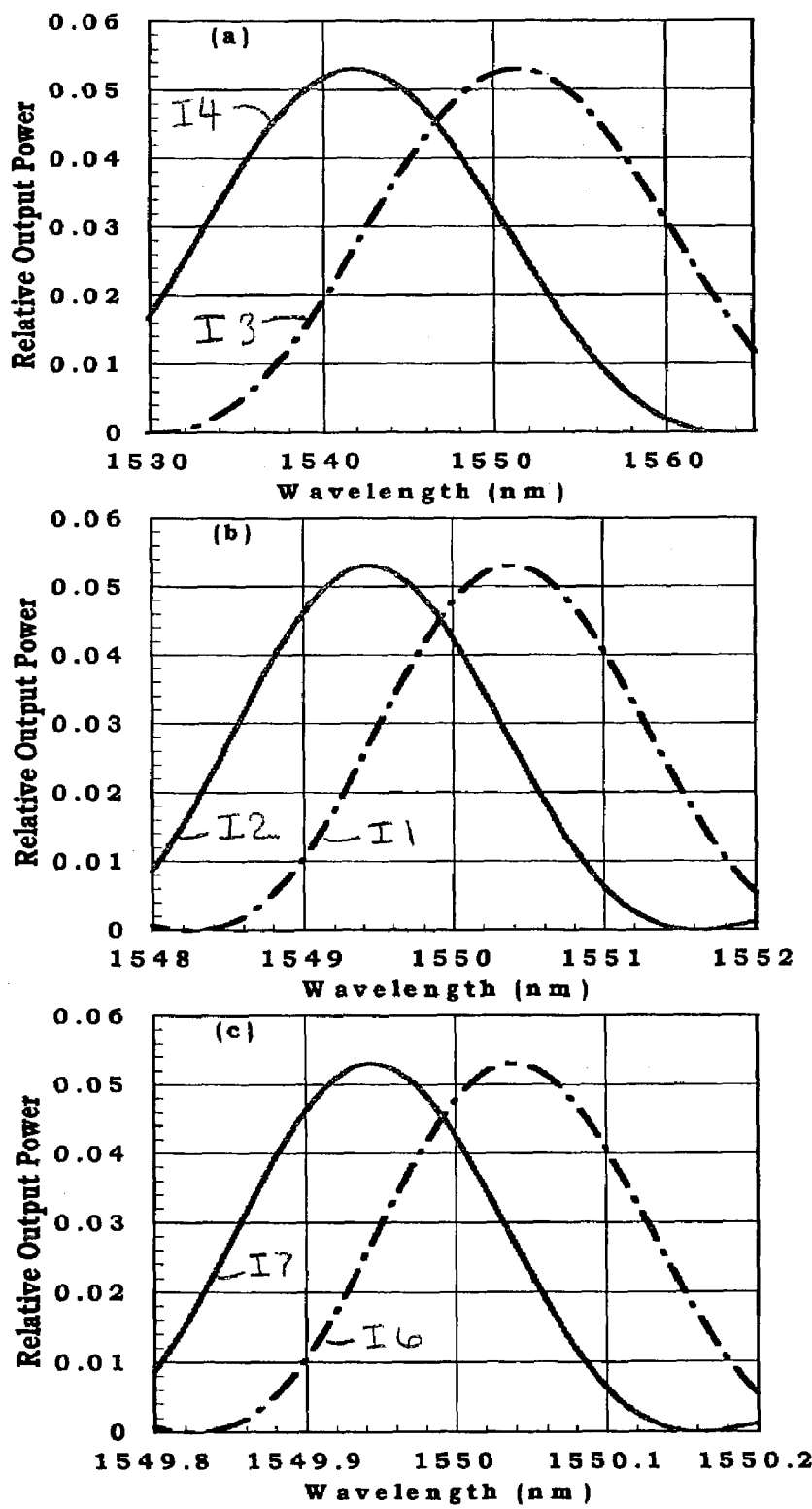
FIG. 10A is a chart showing the wavelength response for the coarse arrayed wavelength grating of the wavelength meter of FIG. 9A through the design wavelength range, the C-band.
FIG. 10B is a chart showing the wavelength response for the medium arrayed wavelength grating of the wavelength meter of FIG. 9A.
FIG. 10C is a chart showing the wavelength response for the fine arrayed wavelength grating of the wavelength meter of FIG. 9A.

The length difference of the third and fourth waveguides 603a is preferably configured so that the free spectrum range of the coarse AWG is 40 nm and is measured with the associated photodetectors 951 and 952 (FIG. 9B) of photodetector array 940. The present invention features an integrated customized single device array replacing the closely spaced photodetectors and providing for single step assembly positioning with respect to the waveguide chip. The length of the output slab waveguide and the spacing of the output waveguides are configured for the peak wavelength of the wavelength response detected by detectors 951 and 952 of 10 nm difference (90 degree phase shift) as shown in FIG. 10A.

Like above the length difference of the first and second waveguides 603b is preferably configured so that the free spectrum range of the coarse AWG is 4 nm and is measured with the associated photodetectors 953 and 954 (FIG. 9B) of photodetector array 940. The length of the output slab waveguide and the spacing of the output waveguides are configured for the peak wavelength of the wavelength response detected by detectors 953 and 954 of 1 nm difference (90 degree phase shift) as shown in FIG. 10B.

The length difference of the sixth and seventh waveguides 603c is preferably configured so that the free spectrum range of the coarse AWG is 0.4 nm and is measured with the associated photodetectors 955 and 956 (FIG. 9B) of photodetector array 940. The length of the output slab waveguide and the spacing of the output waveguides are configured for the peak wavelength of the wavelength response detected by detectors 955 and 956 of 0.1 nm difference (90 degree phase shift) as shown in FIG. 10C.

To allow the free spectrum range of the fine AWG to be 0.4 nm, the length difference of the sixth and seventh waveguides 603c is approximately 4 mm (for the SiO2 based PLC). A 4 mm length difference is challenging from a geometric point of view for a compact chip. Small bending radius should be avoided to reduce waveguide losses. A proposed option shown in FIG. 9 is a corner mirror 960 achieving 4 mm length difference between the sixth and seventh waveguides with relatively large bending radius of the waveguides. The corner mirror may optionally be formed by the side of the waveguide structure. Alternatively, a very small chip size can be achieved with a loop like waveguide utilizing one crossing if a bend radius close to 0.6 mm is allowed. In such a loop like waveguide, the waveguide crosses over itself, thereby defining a loop which increases the path length thereof.

Figure 12:
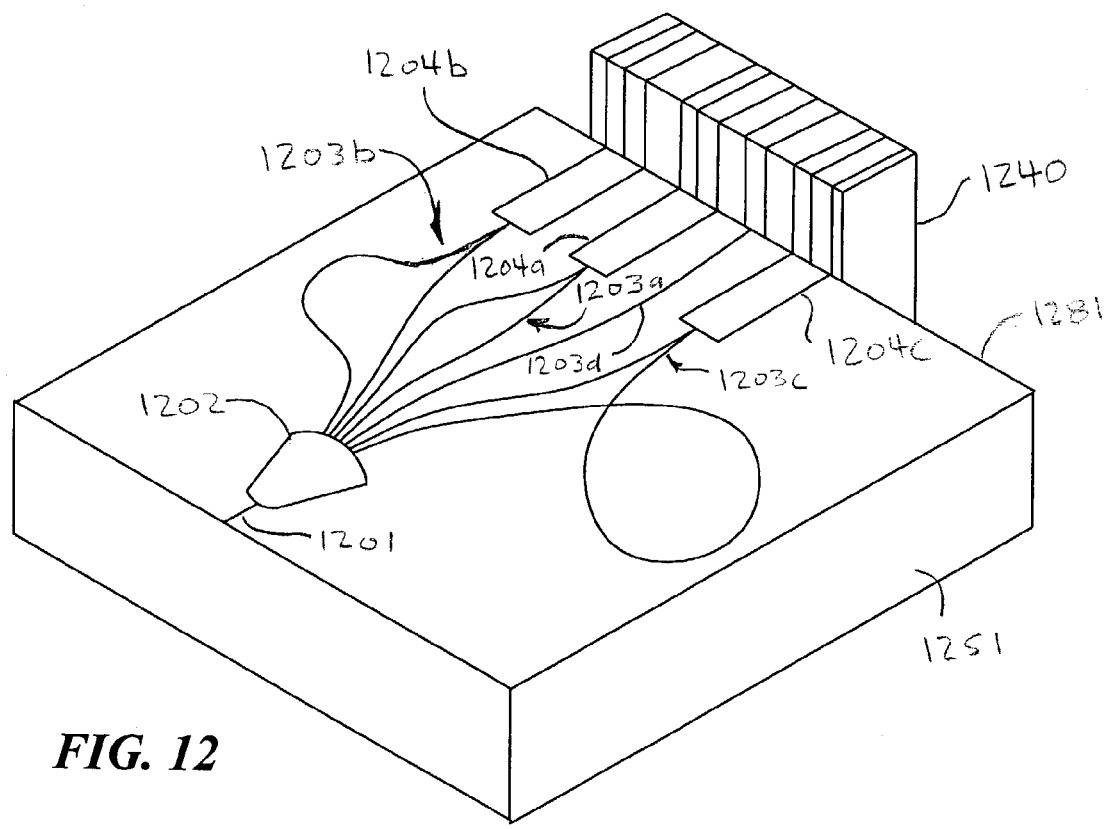
FIG. 12 is a perspective drawing of another embodiment of a wavelength meter based upon three arrayed wavelength gratings, wherein a loop is formed in one waveguide of one arrayed wavelength grating to facilitate increased path length thereof and/or to facilitate a more compact layout thereof, according to the present invention.

Referring now to FIG. 12, a perspective view of an embodiment of a wavelength meter similar to that shown in FIG. 9A, but having one waveguide cross over itself to define a loop, rather than having a corner mirror, is shown.

Thus, according to this embodiment of the present invention, the AWGs are formed upon a substrate 1251, in a manner similar to the fashion in which the AWGs are formed upon the substrate 981 of FIG. 9A. However, increased length of one waveguide 1251 is achieved utilizing a loop formed therein, rather than the corner mirror 960 of FIG. 9A. As in the embodiment shown in FIG. 9A, an input waveguide 1201 provides light to a slab waveguide 1202. A medium AWG 1203b, a coarse AWG 1203a and a fine AWG 1203c are defined so as to facilitate unambiguous wavelength measurement, as discussed above. Detector array 1240 is formed at one end of the substrate 981, as discussed in relation to FIG. 9A above. Waveguide 1203d facilitates the measurement of power, as discussed above.

The wavelength responses of detectors 951 and 952 are essentially sinusoidal with a period of 40 nm and phase difference of 90 degree. Therefore, signals from detectors 951, 952 and 920 can be processed to provide continuously the laser wavelength within the range of 1530–1565 nm with a precision better than 1 nm.

Similarly, the wavelength responses of detectors 953 and 954 are essentially sinusoidal with a period of 4 nm and phase difference of 90 degree. Therefore, signals from detectors 953, 954 and 920 can be processed to provide continuously the laser wavelength within the range of 4 nm with a precision better than 0.1 nm. Also, the wavelength responses of detectors 955 and 956 are essentially sinusoidal with a period of 0.4 nm and phase difference of 90 degree. Therefore, signals from detectors 955, 956 and 920 can be processed to provide continuously the laser wavelength within the range of 0.4 nm with a theoretical precision better than 0.01 nm. The fine AWG may also be utilized by itself to lock the laser wavelength in the case that the coarse and medium AWG are determined to be correct. Following the same procedure as above the required input power is estimated to be 0.012 mW for this three element implementation.

The fine AWG may also be utilized by itself to lock the laser wavelength in the case that the coarse and medium AWG are determined to be correct.

Photo Diode Array and Associated Mounting Scheme

Another embodiment of the invention is a novel photo diode array replacing the far end of the output slab waveguide and the individual output waveguide to the detectors and the individual photodetectors as shown in FIG. 9B. The output side of the output slab waveguide is designed with windows that are effective apertures to select the light that is lead to impinge on the detectors; conventionally the window corresponds to the size of the output waveguide. This novel detector system is budded with its front side against the end of the waveguide chip perpendicular to the waveguide layers. The present invention features apertures sandwiched between the output side of the output slab waveguide and the photo detector array. Consequently fabrication methods include fashioning the apertures onto the back of the waveguide structure as well as fashioning the apertures onto the front of the photo diode array. A front illuminated photo diode design is implemented such that tiny individual detectors are fashioned on it having narrow stripe shaped sensitive areas. They are positioned across a line such that there center spacing is in conformance with the required detector locations determined from the waveguide structure and its output window locations. The stripe width is determined by the width of the design of the output windows. The height of the strips is chosen to accommodate the mounting tolerances in height of the assembly. The lateral mounting position can be used for instance in the above described two element implementation to compensate for the manufacturing tolerances in the waveguide grating, thus allowing for adjustment of this parameter and providing for a potentially significant yield increase. In any event the proposed detections system reduces the size of the waveguide system due to the otherwise needed discriminations against non-guided light intensity emerging from the output slab waveguide. Conventionally light emerging from the output slab waveguide between the output channels has to be discriminated against to eliminate its contribution to the detected light on conventional implementations of individual output waveguides feeding detectors. Those skilled in the art will appreciate that the concept of the aperture replacing a single mode waveguide can be applied elsewhere as well, for example, an aperture could replace an input waveguide.

The photo diode used for the total power measurement may be shaped larger due to it being feed by a waveguide with no constrains from output window requirements.

Temperature Compensation

The effective optical path length changes with temperature. To achieve a precision close to the theoretical limit a thermistor 980 placed on the waveguide chip 981 is added to measure its temperature to provide the input for compensation.

Guiding Structures

Based on mostly planar integrated processing technology the preferred implementation of the wavelength monitor is utilizing silicon oxide material due to its small thermal change of the refractive index coefficient and predictable uniform expansion characteristics. However, Indium-Phosphate based circuit and Silicon-Germanium based circuits are options.

The optical waveguides of the wavelength monitor can utilize a hetero structure with lateral guiding by a buried structure as indicated in FIGS. 11A and 11B or, alternatively, a ridge type surface structure. The buried structure possesses maturity of the technology. However, the ridge type surface structure has manufacturing advantages.

FIG. 11A shows a cladding 1101 formed upon a substrated 1100. The cladding preferably comprises $SiO_2$ and the substrate preferably comprises Si. Seven AWG cores 1102a are formed within the cladding 1101. Each AWG core preferably comprises $SiO_2$—$GeO_2$.

FIG. 11B shows the cladding 1101 formed upon the substrate 1100 of FIG. 11A, wherein a slab waveguide is defined by the core 1102b.

Electrical Multiplexing

The wavelength monitor requires electrical connections for, in this case, 7 detectors and 1 thermistor. In some cases, it is undesirable to implement the package with so many pins (individual electric connections of the package to the outside). If for instance all the cathodes of the photodetectors are common, still 10 pins are required. In order to reduce the number of pins, an electronic time domain multiplexer can be put in the package. As an example, analog switches can be utilized to power and select the photodiodes sequentially to multiplex all the detector currents onto one output connection. However, the preferred method of evaluation of the signals may be by means of digital signal processing with an eight channel analog to digital converter integrated into the package. The above introduced noise current of the photo diodes is actually dependent on measuring time; for a time near 1 µs the given value of 10 nA is reasonable. For ultra fast response monitoring and in particular wavelength looking a sampling time closer to 10 ns may be required which in turn would probable increase the input power requirement by a factor of 10. Conversely a sampling time of 100 µs in a somewhat slower measuring system would probable decrease the input power requirement by a factor of 10.

Comparison of Multi Element Implementation and Extensions

The preferred embodiment of the three element implementation (FIG. 9) compared to the preferred embodiment of the two element implementation (FIG. 6) has the following advantages. For the two element system the wavelength responses of the coarse AWG and the peak wavelengths are very sensitive to the length difference between waveguides, changing it by a small amount may result in a measurement range failing to cover the full C-band. For the three element embodiment, the wavelength responses of the coarse AWG and medium AWG are both essentially periodical sinusoidal response, so, the manufacturing variations of the length difference between waveguides has little affect on the measurement range.

The three element embodiment is described above for a single input waveguide, however, the input slab waveguide my have multiple input channels. In this case input signals from one of such channel at a time can be wavelength monitored if the associated calibration is considered. The calibrations are different for each of these input waveguides due to the phase shifts introduced by off-center input waveguide locations.

Figure 13:
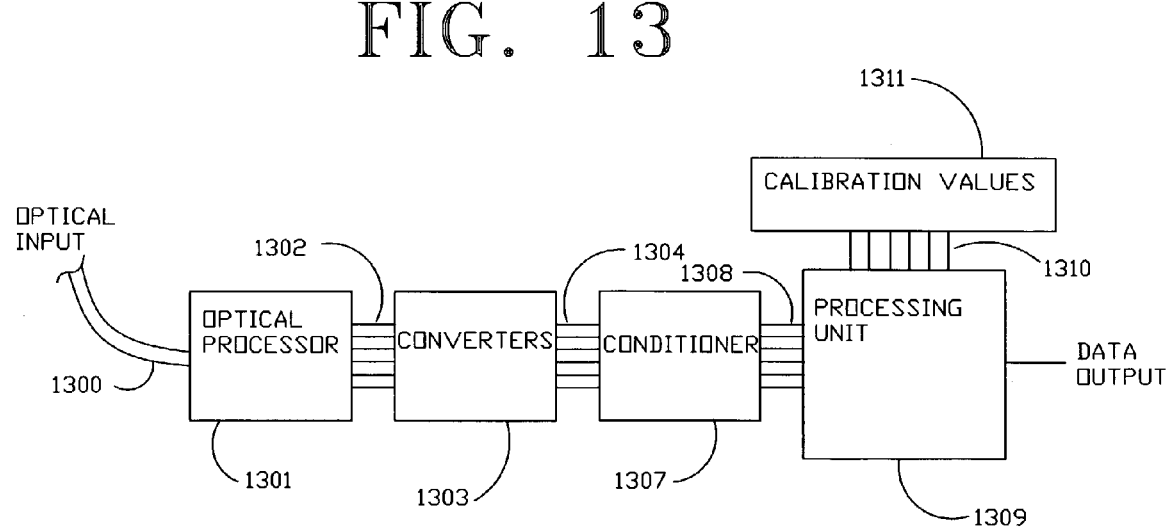
FIG. 13 is a block diagram of a wavelength meter of the present invention, wherein an optical processor is part of a system for measuring or monitoring the wavelength of light.

Referring now to FIG. 13, a system for receiving an optical input and for providing a data output representative of a wavelength of the optical input is shown. The optical input may be via an optical fiber 1300 and may be from a laser, for example. In general an optical system dividing off a portion of the total available light and transmitting and coupling it to the input waveguide is utilized and provides light to the optical processor 1301. The optical processor 1301 as described above extracts the wavelength information and provides it in form of a plurality of optical outputs 1302 to converters 1303. The information regarding the wavelength of the input is contained in certain ratios and alike of the light intensity of the outputs of the optical processor 1301.

The converters 1303 comprise optical to electrical transducers, such as the photodetectors 1240 of FIG. 12. Generally, the number of photodetectors will correspond to the number of optical outputs 1302. Generally one electrical output 1304 for each transducer will be provided to a conditioner 1307. The conditioner unit may include bias circuitry for the converters 1303, analog multiplexers, buffer amplifiers, sample-and-hold elements, analog-to-digital converter and digital multiplexers, its output(s) may be in analog form or in digital form. The output(s) from the conditioner 1307 are inputs to a processing unit (PU) 1309 which finalizes the presentation of the information and has as its output the wavelength of the optical input. The processing unit 1309 may be analog or digital.

However, according to the preferred embodiment of the present invention, digital outputs 1308 from the analog-to-digital-converter of the conditioner 1307 are provided to the processing unit PU 1309 for digital processing. Optionally, these digital outputs may be multiplexed and provided to the CPU 1309 serially.

The chosen geometry implies the algorisms that can be implemented by the processing unit to determine and present the wavelength, however, due to such factors as manufacturing tolerances, such as in the construction of the slab waveguides and the arrayed waveguides, the digital outputs of the converter may require unit specific interpretation in order to represent the wavelength of the optical input with the desired accuracy. This can be accomplished by providing calibration values 1311 to the PU 1309. These calibration inputs 1311 mainly represent actual path length that are implemented in each specific unit and enter the calculation of the resultant wavelength as phase and period information. In the case of units with multiple inputs different sets of these calibration inputs for each input are required since different inputs have different path length in the input slab waveguide; these would be selected depending on the system knowledge which of the inputs is active. A variety of means to make available these calibration inputs is possible, for example, in the case of digital signal processing write once memory may be used. Thus, a plurality of calibration signals 1310 can be used according to well-known principles to modify the interpretation of the digital signals, so as to more accurately represent the wavelength of the optical input. After being so interpreted the data output may be used to lock the wavelength of a laser used in DWDM optical communications systems, for example.

The calibration parameters may, for example, be defined by providing a plurality of sequential optical inputs to the optical processor 1301, wherein each sequential optical input is of a different and known wavelength. Calibration parameters can then be defined so as to cause the data output from the PU 1309 to accurately represent the corresponding sequential optical input.

It is understood that the exemplary photonic integrated circuit planar wavelength meters described herein and shown in the drawings represent only presently preferred embodiments of the invention. Indeed, various modifications and additions may be made to such embodiments without departing from the spirit and scope of the invention. For example, various materials other than those described above may be used to construct the AWGs. Indeed, the AWGs may be formed using non-integrated circuit methodologies, such as discrete component technologies (wherein the slabs are formed of glass and the AWG waveguides are formed of optical fibers, for example). Thus, these and other modifications and additions may be obvious to those skilled in the art and may be implemented to adapt the present invention for use in a variety of different applications.

What is claimed is:

1. A method for measuring a wavelength of light within a predetermined spectral range, the method comprising using a plurality of arrayed-waveguide-gratings (AWGs), wherein at least one AWG is used to resolve an ambiguity of wavelength measurement present in another AWG.

2. The method as recited in claim 1, wherein a coarser AWG is used to resolve an ambiguity of wavelength measurement in a finer AWG.

3. The method as recited in claim 2, wherein the coarser AWG is used to resolve an ambiguity of wavelength measurement in a next finer AWG.

4. The method as recited in claim 2, further comprising using one intermediate AWG to facilitate resolution of an ambiguity of the wavelength measurement in the finer AWG in case that the resolution of the coarser AWG is insufficient to do so.

5. The method as recited in claim 2, specifically comprising using a plurality of intermediate AWGs to facilitate resolution of an ambiguity of wavelength measurement in a finer AWG by using the resolution of the next coarser AWG in a cascaded fashion.

6. The method as recited in claim 2, further comprising using a reflector to facilitate an increased path length of at least one waveguide of at least one AWG.

7. The method as recited in claim 2, further comprising using a reflector to facilitate a more compact layout of at least one waveguide of at least one AWG.

8. The method as recited in claim 2, further comprising using a crossover loop to facilitate an increased path length of at least one waveguide of at least one AWG.

9. The method as recited in claim 2, further comprising using a crossover to facilitate a more compact layout of at least one waveguide of at least one AWG.

10. The method as recited in claim 2, wherein at least one AWG has a photodetector array disposed at an output end thereof.

11. The method as recited in claim 2, wherein all AWGs have a common photodetector array disposed at the output ends thereof.

12. The method as recited in claim 1, wherein at least one AWG comprises a plurality of apertures, each aperture limiting the light allowed to pass to one photodetector.

13. The method as recited in claim 2, wherein all AWGs utilize a common photodetector array disposed at their output ends.

14. The method as recited in claim 13, wherein apertures are fabricated on the output side of an output slab waveguide so as to eliminate a need for output waveguides.

15. The method as recited in claim 13, wherein apertures are fabricated on the input side of the photodetectors so as to eliminate a need for output waveguides.

16. The method as recited in claim 2, wherein the coarser AWG and the finer AWG are disposed upon a common substrate.

17. The method as recited in claim 2, wherein the coarser AWG and the finer AWG are disposed upon a common substrate formed of silicon.

18. The method as recited in claim 2, wherein the coarser AWG and the finer AWG are disposed within a common cladding.

19. The method as recited in claim 2, wherein the coarser AWG and the finer AWG are disposed within a common cladding formed of $SiO_2$.

20. The method as recited in claim 2, wherein the coarser AWG and the finer AWG are formed of $SiO_2$—$GeO_2$.

21. The method as recited in claim 2, further comprising using a photodetector to determine input power.

22. The method as recited in claim 2, further comprising using a detector element to determine input power to a wavelength meter being part of an array of photodetectors, other photodetectors of the array receiving outputs of the coarse AWG and fine AWG.

23. A method for monitoring a wavelength of an output of a laser in a channel based system, the method comprising:
 identifying the channel of the output of the laser from an optical input;
 locking the laser's wavelength onto a predetermine wavelength within that channel; and
 wherein (1) the combination of optically identifying a channel and optically locking the laser's wavelength mitigates channel ambiguity;
 (2) identifying the channel is facilitated by a coarse AWG; and
 (3) locking the laser by a fine AWG.

24. The method as recited in claim 23, further comprising using an intermediate AWG which cooperates with the coarse AWG to identify the channel of the laser.

25. A method of controlling an output of a laser, the method comprising:
monitoring a wavelength of an output of a laser, the monitoring comprising:
using a coarse AWG to resolve an ambiguity of wavelength measurement in a fine AWG; and
using the monitored value of the wavelength of the laser in a feedback control loop to maintain the wavelength of the laser at a desired value.

26. A method for monitoring a wavelength of an output of a laser, the method comprising:
determining a channel of an output of the laser using a coarse AWG; and
locking the output of the laser to a desired wavelength using a fine AWG.

27. The method as recited in claim 26, wherein the coarse AWG and the fine AWG use the same input waveguide and the same input slab.

28. A method for monitoring a wavelength of an output of a laser, the method comprising:
using a coarse AWG to determine a wavelength of the laser with a precision of better than 25 GHz; and
using a fine AWG to determine a wavelength of the laser with a precision of better than 1 GHz.

29. The method as recited in claim 28, wherein the coarse AWG and the fine AWG use the same input waveguide and the same input slab waveguide.

30. A device for monitoring a wavelength of an output of a laser, the device comprising:
a fine AWG configured to lock the laser's wavelength onto a predetermined wavelength; and
a coarse AWG configured to resolve ambiguity of wavelength measurement in the fine AWG.

31. The device as recited in claim 30, further comprising an intermediate AWG configured to cooperate with the coarse AWG to resolve ambiguity of wavelength measurement in the fine AWG.

32. The device as recited in claim 30, further comprising a plurality of intermediate AWGs configured to cooperate with the coarse AWG to resolve ambiguity of wavelength measurement in the fine AWG.

33. The device as recited in claim 30, wherein the coarse AWG comprises more than two AWG waveguides and wherein the fine AWG comprises two AWG waveguides.

34. The device as recited in claim 30, wherein the coarse AWG comprises six AWG waveguides and wherein the fine AWG comprises two AWG waveguides.

35. The device as recited in claim 30, further comprising using a reflector to facilitate an increased path length of at least one waveguide of at least one AWG.

36. The device as recited in claim 30, further comprising using a crossover loop to facilitate an increased path length of at least one waveguide of at least one AWG.

37. The device as recited in claim 30, further comprising a common substrate upon which the coarse AWG and the fine AWG are formed.

38. The device as recited in claim 30, further comprising a common substrate formed of Si upon which the coarse AWG and the fine AWG are formed.

39. The device as recited in claim 30, further comprising a common cladding within which the coarse AWG and the fine AWG are formed.

40. The device as recited in claim 30, further comprising a common cladding formed of $SiO_2$ within which the coarse AWG and the fine AWG are formed.

41. The device as recited in claim 30, wherein the coarse AWG and the fine AWG are formed of $SiO_2$—$GeO_2$.

42. The device as recited in claim 30, wherein:
the coarse AWG comprises:
an input waveguide;
a input slab;
a plurality of intermediate AWG waveguides;
an output slab; and
a plurality of output waveguides;
and the fine AWG comprises:
an input waveguide;
a input slab;
two intermediate AWG waveguides;
an output slab; and
two output waveguides.

43. The device as recited in claim 30, wherein:
the coarse AWG comprises:
an input waveguide;
a input slab;
a plurality of intermediate AWG waveguides;
an output slab; and
a plurality of output waveguides;
and the fine AWG comprises:
the same input waveguide as the coarse AWG;
the same input slab as the coarse AWG;
two intermediate AWG waveguides;
an output slab; and
two output waveguides.

44. The device as recited in claim 30, wherein:
the coarse AWG comprises a photodetector array formed at an output end thereof; and
the fine AWG comprises a photodetector array formed at an output end thereof.

45. The device as recited in claim 30, wherein:
the coarse AWG comprises a photodetector array formed at an output end thereof and a dedicated window formed at the output end of the coarse AWG defines an aperture which filters light from the coarse AWG to each detector of the array; and
the fine AWG comprises a photodetector array formed at an output end thereof and a dedicated window formed at the output end of the fine AWG defines an aperture which filters light from the fine AWG to each detector of the array.

46. The device as recited in claim 30, further comprising a photodetector configured to determine a power of the output of the laser.

47. A fiber optic communication system comprising:
a plurality of lasers; and
a device for monitoring a wavelength of an output of at least one of the lasers, the device comprising:
a fine AWG configured to lock the laser's wavelength onto a predetermined wavelength; and
a coarse AWG configured to resolve ambiguity of wavelength measurement in the fine AWG.

48. A device for measuring a wavelength of an optical signal the device comprising:
an optical processor configured to provide optical output signals representative of the wavelength of an optical input signal by determining which wavelength subdivision the wavelength is in and what the wavelength is within the wavelength subdivision;
a converter configured to convert the optical output signals into electronic signals representative thereof; and
a computational apparatus configured to receive the electronic signals and to provide a data output representative of the wavelength of the input signal; wherein the optical processor comprises:
a plurality of slab waveguides; and
a plurality of single mode waveguides extending intermediate the slab waveguides; wherein sets of the single mode waveguides and the slab wave guides define a plurality of arrayed waveguide gratings having outputs signals which are evaluated to resolve ambiguity within a defined range of wavelengths and wherein one of the arrayed waveguide gratings has two waveguides and provides a lateral output signal within the output slab waveguide with a substantially sinusoidal shape varying from a peak value to a near zero value corresponding to positive and negative interferences, respectively.

49. The device as recited in claim 48, wherein the arrayed waveguide gratings with two output waveguides comprises either two output waveguides or two apertures.

50. The device as recited in claim 49, wherein the arrayed waveguide gratings with two waveguides and with two output waveguides or two output apertures is configured such that the two outputs provide quadrature signals by placing them approximately an odd number of quarter periods of the output distribution apart with respect to one another.

51. A device for measuring a wavelength of an optical signal, the device comprising:
an optical processor configured to provide optical output signals representative of the wavelength of an optical input signal by determining which wavelength subdivision the wavelength is in and what the wavelength is within the wavelength subdivision;
a converter configured to convert the optical output signals into electronic signals representative thereof; and
a computational apparatus configured to receive the electronic signals and to provide a data output representative of the wavelength of the input signal; wherein the optical processor comprises:
a plurality of slab waveguides; and
a plurality of single mode waveguides extending intermediate the slab waveguides; wherein sets of the single mode wave guides and the slab waveguides define a plurality of arrayed waveguide gratings having outputs signals which are evaluated to resolve ambiguity within a defined range of wavelengths and wherein one of the arrayed waveguide gratings has a free spectral range larger than the define range of wavelengths and all other arrayed wavelength gratings have a free spectral range larger than the wavelength resolution obtained from the arrayed wavelength grating with the next larger free spectral range.

52. The device as recited in claim 51, wherein the plurality of arrayed wavelength gratings comprises a coarse arrayed wavelength grating and a fine arrayed wavelength grating and wherein the coarse arrayed wavelength grating has a free spectral range larger than the defined measuring range of wavelength and the fine arrayed wavelength grating has a wavelength resolution sufficient to fulfill the defined resolution.

53. The device as recited in claim 51, wherein the plurality of arrayed wavelength gratings comprise a coarse arrayed wavelength grating, a medium arrayed wavelength grating and a fine arrayed wavelength grating and wherein the coarse arrayed wavelength grating has a free spectral range larger than the defined range of wavelengths and the fine arrayed wavelength grating has a wavelength resolution sufficient to fulfill the defined resolution and the medium arrayed wavelength grating has both a free spectral range larger than the wavelength resolution of the coarse arrayed wavelength grating and a wavelength resolution larger than the free spectral range of the fine arrayed wavelength grating.

54. The device as recited in claim 51, wherein the plurality of arrayed wavelength gratings comprises a coarse arrayed wavelength grating, a plurality of medium arrayed wavelength gratings, and a fine arrayed wavelength grating and wherein the coarse arrayed wavelength grating has a free spectral range larger than the defined range of wavelength and the fine arrayed wavelength grating has a wavelength resolution sufficient to fulfill the defined resolution and each of the medium arrayed wavelength gratings has both a free spectral range larger than the wavelength resolution of the next more coarse arrayed wavelength grating and a wavelength resolution better than the free spectral range of the next finer arrayed wavelength grating.

55. The device as recited in claim 52, wherein the coarse arrayed wavelength grating has a free spectral range of 95 nm and is larger than the defined range of wavelengths of 35 nm near 1550 nm and the fine arrayed wavelength grating has a free spectral range of 0.4 nm and a wavelength resolution sufficient to fulfill the defined resolution of 0.01 nm.

56. The device as recited in claim 53, wherein the coarse arrayed wavelength grating has a free spectral range of 40 nm and is larger than the defined range of wavelength of 35 nm near 1550 nm and the medium arrayed wavelength grating has a free spectral range of 4 nm and the fine arrayed wavelength grating has a free spectral range of 0.4 nm and a wavelength resolution sufficient to fulfill the defined resolution of 0.01 nm.

57. A device for measuring a wavelength of an optical signal, the device comprising:
an optical processor configured to provide optical output signals representative of the wavelength of an optical input signal by determining which wavelength subdivision the wavelength is in and what the wavelength is within the wavelength subdivision;
a converter configured to convert the optical output signals into electronic signals representative thereof; and
a computational apparatus configured to receive the electronic signals and to provide a data output representative of the wavelength of the input signal; wherein the optical processor comprises:
a plurality of slab waveguides; and
a plurality of single mode waveguides extending intermediate the slab waveguides; wherein sets of the single mode waveguides and the slab waveguides define a plurality of arrayed waveguide gratings having outputs signals which are evaluated to resolve ambiguity within a defined range of wavelengths and wherein at least one arrayed wavelength grating is configured with a mirror in a waveguide.

58. A device for measuring a wavelength of an optical signal, the device comprising:
an optical processor configured to provide optical output signals representative of the wavelength of an optical input signal by determining which wavelength subdivision the wavelength is in and what the wavelength is within the wavelength subdivision;
a converter configured to convert the optical output signals into electronic signals representative thereof; and
a computational apparatus configured to receive the electronic signals and to provide a data output representative of the wavelength of the input signal; wherein the optical processor comprises:
a plurality of slab waveguides; and
a plurality of single mode waveguides extending intermediate the slab waveguides, wherein sets of the single mode waveguides and the slab waveguides define a plurality of arrayed waveguide gratings having outputs signals which are evaluated to resolve ambiguity within a defined range of wavelengths and wherein at least one arrayed wavelength grating is configured with a loop and a cross in a waveguide.

59. A device for measuring a wavelength of an optical signal, the device comprising:
an optical processor configured to provide optical output signals representative of the wavelength of an optical input signal by determining which wavelength subdivision the wavelength is in and what the wavelength is within the wavelength subdivision;
a converter configured to convert the optical output signals into electronic signals representative thereof;
a computational apparatus configured to receive the electronic signals and to provide a data output representative of the wavelength of the input signal; and
a multiplexer for providing the electronic signals to the computational apparatus, wherein the multiplexer is an analog reverse voltage applying scanning current transmitting multiplexer.

60. A device for measuring a wavelength of an optical signal, the device comprising:
an optical processor configured to provide optical output signals representative of the wavelength of an optical input signal by determining which wavelength subdivision the wavelength is in and what the wavelength is within the wavelength subdivision;
a converter configured to convert the optical output signals into electronic signals representative thereof;
a computational apparatus configured to receive the electronic signals and to provide a data output representative of the wavelength of the input signal, wherein an input side of the computational apparatus comprises a plurality of analog-to-digital converters.

61. The device as recited in claim 60, wherein the computational apparatus comprises an embedded processor.

62. The device as recited in claim 60, wherein the computational apparatus utilizes high speed digital signal processing to evaluate a wavelength in 1 microsecond or less.

63. A device for measuring a wavelength of an optical signal, the device comprising:
an optical processor configured to provide optical output signals representative of the wavelength of an optical input signal by determining which wavelength subdivision the wavelength is in and what the wavelength is within the wavelength subdivision;
a converter configured to convert the optical output signals into electronic signals representative thereof;
computational apparatus configured to receive the electronic signals and to provide a data output representative of the wavelength of the input signal, wherein an input side of the computational apparatus comprises a plurality of analog-to-digital converters to facilitate parallel digital signal processing.

64. The device as recited in claim 63, wherein the computational apparatus comprises an embedded parallel processor or multiple embedded processors.

65. A device for controlling the wavelength of a coherent optical source within a single defined range of wavelength to a defined resolution, the device comprising:
an optical processor for outputting optical signals related to the wavelength of the optical input signal by determining which wavelength subdivision the wavelength is in and what the wavelength is within the wavelength subdivision;
a converter for converting the optical signals into electronic signals; and
a computational apparatus for receiving the electronic signals and for receiving a set-value of the desired wavelength and for providing means for the coherent optical source to emit light at a wavelength within a defined wavelength precision requirement, wherein the coherent light source comprises a laser for optical communication within a wavelength multiplexed optical communication network, wherein the wavelength multiplexed optical communication network is reconfigurable in channelization and, wherein reconfiguration of the wavelengths for communication is performed in less than approximately 1 micro second.

66. A device for controlling the wavelength of a coherent optical source within a single defined range of wavelengths to a defined resolution, the device comprising:
an optical processor for outputting optical signals related to the wavelength of the optical input signal by determining which wavelength subdivision the wavelength is in and what the wavelength is within the wavelength subdivision;
a converter for converting the optical signals into electronic signals, a computational apparatus for receiving the electronic signals and for receiving a set-value of the desired wavelength and for providing means for the coherent optical source to emit light at a wavelength within a defined wavelength precision requirement; and
an optical source configured to be used as a calibration reference.

* * * * *